US008043549B2

(12) United States Patent
Marumoto et al.

(10) Patent No.: US 8,043,549 B2
(45) Date of Patent: Oct. 25, 2011

(54) INJECTION APPARATUS

(75) Inventors: Hirotsugu Marumoto, Chiba (JP); Shigeru Takeuchi, Chiba (JP); Kohei Washida, Chiba (JP); Daisuke Goto, Chiba (JP); Munekatsu Kamiya, Hong Kong (CN)

(73) Assignees: Sumitomom Heavy Industries, Ltd., Tokyo (JP); Spiral Logic Limited, Hong Kong (CN)

( * ) Notice: Subject to any disclaimer, the term of this patent is extended or adjusted under 35 U.S.C. 154(b) by 0 days.

(21) Appl. No.: 12/808,216

(22) PCT Filed: Aug. 8, 2008

(86) PCT No.: PCT/JP2008/064333
§ 371 (c)(1),
(2), (4) Date: Jun. 15, 2010

(87) PCT Pub. No.: WO2009/084264
PCT Pub. Date: Jul. 9, 2009

(65) Prior Publication Data
US 2010/0258981 A1    Oct. 14, 2010

(30) Foreign Application Priority Data

Dec. 27, 2007  (JP) ................................ 2007-337956

(51) Int. Cl.
*B29C 45/48* (2006.01)
(52) U.S. Cl. .................. 264/328.17; 425/207; 425/587
(58) Field of Classification Search ............ 264/328.14, 264/328.17; 425/205–209, 587
See application file for complete search history.

(56) References Cited

U.S. PATENT DOCUMENTS

| 3,689,184 A * | 9/1972 | Morse .......................... 100/148 |
| 5,486,327 A * | 1/1996 | Bemis et al. ............. 264/211.21 |
| 2004/0228946 A1 | 11/2004 | Yokoyama | |
| 2006/0197254 A1 * | 9/2006 | Onishi ..................... 264/211.21 |

FOREIGN PATENT DOCUMENTS

| DE | 102005020156 | * 11/2006 |
| JP | 03-114720 | * 5/1991 |
| JP | 5-261781 | 10/1993 |
| JP | 9-104056 | 4/1997 |
| JP | 9-314625 | 12/1997 |
| JP | 2004-291409 | 10/2004 |
| JP | 2005-131855 | 5/2005 |

* cited by examiner

*Primary Examiner* — Jill Heitbrink
(74) *Attorney, Agent, or Firm* — Squire, Sanders & Dempsey (US) LLP

(57) ABSTRACT

An object is to reduce the axial dimension of an injection apparatus (31), facilitate the work of removing and inserting a screw (20), and improve the quality of molded products. The injection apparatus (31) comprises a heating cylinder (17), a screw (20), and a drive apparatus. The screw (20) includes a plasticizing portion which includes a body portion (45a) and a flight (53) projectingly formed on an outer circumferential surface of the body portion (45a). An index ε, which is obtained by dividing a value obtained by adding a screw stroke S and a screw effective length L together by the screw stroke S, satisfies the relation 2.0<ε<4.5. Even when the screw (20) is shortened, resin can be melted satisfactorily. Accordingly, the axial dimension of the injection apparatus (31) can be reduced.

8 Claims, 9 Drawing Sheets

FIG. 6
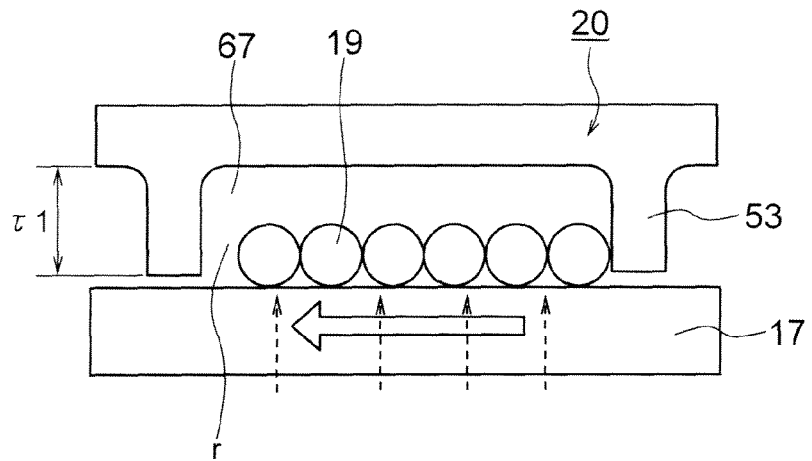
FIG. 7
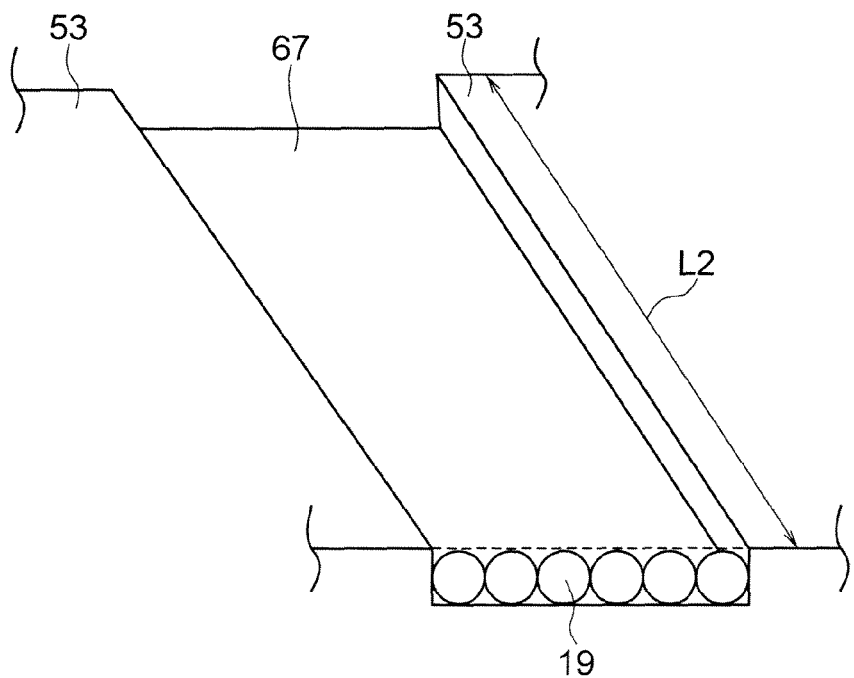
FIG. 8
| γ1 | 1.0 | 2.0 | 2.5 | 3.0 | 3.5 |
|---|---|---|---|---|---|
| | ○ | ○ | ○ | × | × |

FIG. 13

INDEX ε

| | 1 | 2 | 2.5 | 3 | 3.5 | 4 | 4.5 | 5 | 5.5 | 6 |
|---|---|---|---|---|---|---|---|---|---|---|
| STANDARD SCREW | × | × | × | × | × | × | △ | ○ | ○ | |
| SINGLE FLIGHT | × | × | △ | ○ | ○ | △ | × | × | × | |
| DOUBLE FLIGHT | × | △ | ○ | ○ | △ | × | × | × | × | |

INJECTION APPARATUS

TECHNICAL FIELD

The present invention relates to an injection apparatus.

BACKGROUND ART

Conventionally, in a molding machine; for example, in an injection-molding machine, resin heated and melted in a heating cylinder is injected under high pressure and charged into a cavity of a mold apparatus, and the injected resin is cooled and solidified in the cavity, whereby a molded product is obtained.

For such a molding operation, the injection-molding machine includes a mold apparatus, a mold-clamping apparatus and an injection apparatus. The mold-clamping apparatus includes a stationary platen and a movable platen. The movable platen is advanced and retreated by means of a mold-clamping cylinder, whereby the mold apparatus is closed, clamped, and opened.

Meanwhile, the injection apparatus, which is generally of an in-line screw type, includes a heating cylinder for heating and melting resin fed from a hopper, and an injection nozzle for injecting the molten resin. A screw is disposed in the heating cylinder in a reciprocative and rotatable condition. When the screw is advanced by means of a drive apparatus connected to the rear end thereof, resin is injected from the injection nozzle. When the screw is retreated by means of the drive apparatus, metering of resin is performed.

FIG. 1 is a cross sectional view showing a main portion of a conventional injection apparatus. FIG. 2 is a schematic view showing a state where resin is melted within the conventional injection apparatus. FIG. 3 is a view used for explaining a developed distance of the conventional injection apparatus.

In FIG. 1, reference numeral 11 denotes a heating cylinder. An injection nozzle 12 is attached to the front end of the heating cylinder 11, and heaters h1 to h3 for heating the heating cylinder 11 are disposed around the heating cylinder 11. A screw 14 is disposed within the heating cylinder 11 such that the screw 14 can rotate and can advance and retreat. The screw 14 is composed of a flight forming portion 15 and an injection portion 16, and is connected to an unillustrated drive apparatus via a shaft portion 21 at the rear end and a coupler 22. The injection portion 16 is composed of a head portion 41, a rod portion 42 extending rearward from the head portion 41, a check ring 43 disposed around the rod portion 42, and a seal ring 44 attached to the front end of the flight forming portion 15. Notably, the head portion 41, the rod portion 42, etc. constitute a screw head. Further, the check ring 43 and the seal ring 44 serve as a reverse-flow prevention apparatus for preventing reverse flow of resin during an injection step. The drive apparatus is composed of an injection motor and a metering motor. The flight forming portion 15 includes a bar-shaped body portion and a spiral flight 23 formed on the outer circumferential surface of the body portion, so that a spiral groove 24 is formed along the flight 23.

A resin supply port 25 is formed in the heating cylinder 11 in the vicinity of the rear end thereof, and a funnel-shaped hopper 26 is disposed at the resin supply port 25. Resin in the form of pellets stored in the hopper 26 is supplied to the interior of the heating cylinder 11 via the resin supply port 25.

The resin supply port 25 is formed at a location such that the resin supply port 25 faces a rear end portion of the groove 24 when the screw 14 is positioned at the fowardmost position within the heating cylinder 11; i.e., at the advance limit position. The flight forming portion 15 has a supply portion P1, a compression portion P2, and a metering portion P3, formed in this sequence from the rear end to the front end. The supply portion P1 receives the resin supplied via the resin supply port 25. The compression portion P2 melts the supplied resin while compressing the resin. The metering portion P3 meters a predetermined amount of the molten resin each time.

In the injection apparatus having the above-described configuration, in a metering step, the screw 14 is rotated through drive of the metering motor. Thus, the resin supplied from the hopper 26 into the heating cylinder 11 is caused to advance along the groove 24 to thereby pass through the supply portion P1, the compression portion P2, and the metering portion P3 successively, and is heated by the heaters h1 to h3 during the advancement. Further, the resin receives a shear force in a space (shearing space) formed between the inner circumferential surface of the heating cylinder 11 and the groove 24, so that the resin generates heat (hereinafter referred to as "shearing heat generation"), and melts. With this operation, the screw 14 is retreated.

Since the check ring 43 moves forward in relation to the rod portion 42 as the screw 14 is retreated, the resin having reached the front end of the flight forming portion 15 passes through a resin passage between the rod portion 42 and the check ring 43, and reaches a space located forward of the screw head. Accordingly, an amount of molten resin corresponding to a single shot is accumulated forward of the screw head, in a state in which the screw 14 is positioned at the rearwardmost position within the heating cylinder 11; i.e., at the retreat limit position.

Subsequently, in an injection step, the screw 14 is advanced through drive of the injection motor, whereby the resin accumulated forward of the screw head is injected from the injection nozzle 12, and is charged into a cavity of an unillustrated mold apparatus (see, for example, Patent Document 1).

Patent Document 1: Japanese Patent Application Laid-Open (kokai) No. 2004-50415.

DISCLOSURE OF THE INVENTION

Problems to be Solved by the Invention

However, in the conventional injection apparatus, pellets 19 of resin supplied via the resin supply port 25 aggregate, as shown in FIG. 2, while being advanced within the groove 24 in a direction indicated by an arrow, whereby a solid bed b, which is composed of a plurality of pellets 19, is formed within a melt pool r.

In the solid bed b, although heat is easily transferred to pellets 19 present on the circumference of the solid bed b, heat is hardly transferred to pellets 19 located at the interior of the solid bed b. Therefore, a long period of time is required to melt all the pellets 19. Therefore, the heat generated by the heaters h1 to h3 is not efficiently transferred to all the pellets.

Further, since the solid bed b is formed in such a manner that a plurality of pellets 19 are stacked in the depth direction of the groove 24, heat capacity increases. Therefore, even when shearing heat is generated in the resin, as shown in FIG. 3, an increase arises in a developed distance L1 within which the resin melts completely.

As a result, the length of the screw 14 must be increased accordingly, and, thus, the length of the heating cylinder 11 also must be increased. Therefore, the axial dimension of the injection apparatus increases, and a work of removing and inserting the screw 14 at the time of maintaining the screw 14 or replacing it with a different one becomes difficult.

Further, since the surface area of the heating cylinder 11 increases, the amount of radiated heat increases, with a resultant decrease in energy efficiency. In addition, since the resin is uselessly heated, burning of resin; i.e., resin burning occurs. Moreover, although the pellets 19 present at the circumference are melted to a sufficient degree, the pellets 19 present at the interior are not melted to a sufficient degree. In addition, many pellets 19 are melted mainly through the generation of shearing heat, as the solid bed b advances within the groove 24. Accordingly, the resin cannot be melted uniformly. Thus, the quality of molded products deteriorates.

An object of the present invention is to solve the above-mentioned problems in the conventional injection apparatus and to provide an injection apparatus which can reduce the axial dimension of the injection apparatus, facilitate the work of removing and inserting a screw, and improve the quality of molded products.

Means For Solving The Problems

In order to achieve the above object, an injection apparatus of the present invention comprises a heating cylinder, a screw which is rotatably disposed within the heating cylinder; and a drive apparatus disposed at a rear end of the screw.

The screw includes a plasticizing portion which includes a body portion and a flight projectingly formed on an outer circumferential surface of the body portion.

An index $\epsilon$, which is obtained by dividing a value obtained by adding a screw stroke S and a screw effective length L together by the screw stroke S, satisfies the following relation:

$$2.0 < \epsilon < 4.5.$$

EFFECTS OF THE INVENTION

According to the present invention, an injection apparatus comprises a heating cylinder, a screw which is rotatably disposed within the heating cylinder; and a drive apparatus disposed at a rear end of the screw.

The screw includes a plasticizing portion which includes a body portion and a flight projectingly formed on an outer circumferential surface of the body portion.

An index $\epsilon$, which is obtained by dividing a value obtained by adding a screw stroke S and a screw effective length L together by the screw stroke S, satisfies the following relation:

$$2.0 < \epsilon < 4.5.$$

In this case, since the index $\epsilon$ satisfies the relation $2.0 < \epsilon < 4.5$, even when the screw is shortened, resin can be melted satisfactorily. Accordingly, the axial dimension of the injection apparatus can be reduced, the work of removing and inserting the screw can be readily performed, and the quality of molded products can be improved.

BRIEF DESCRIPTION OF DRAWINGS

[FIG. 6] Schematic view relating to the first embodiment of the present invention and showing a state where resin is melted.

[FIG. 7] View used for explaining a developed distance of the injection apparatus according to the first embodiment of the present invention.

[FIG. 8] Table relating to the first embodiment of the present invention and for showing an evaluation result as to whether a solid bed was formed.

[FIG. 13] Table showing a comparison of melting states of resin for each screw.

DESCRIPTION OF REFERENCE NUMERALS

Figure 1:
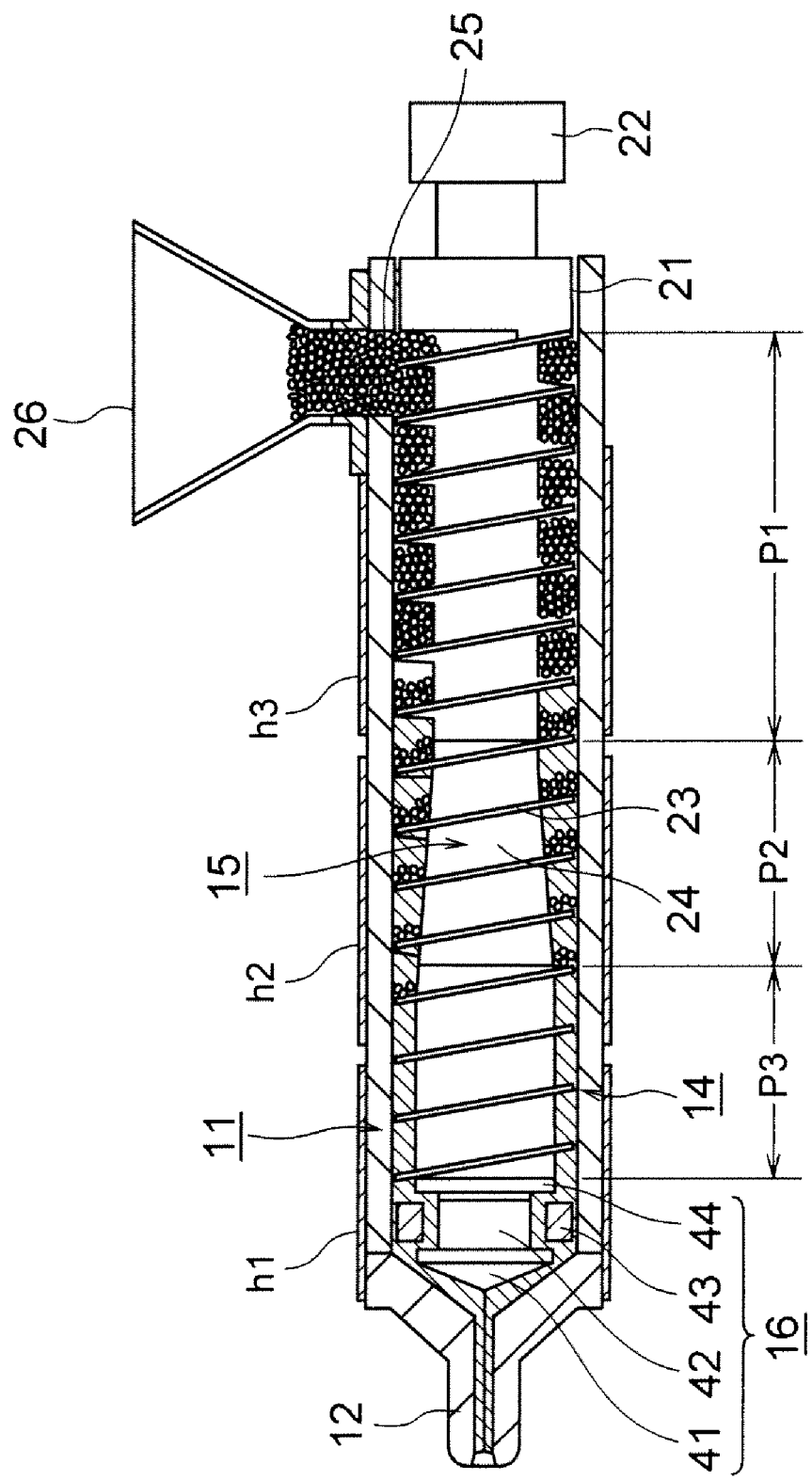
[FIG. 1] Cross sectional view showing a main portion of a conventional injection apparatus.

17: heating cylinder
20: screw
31: injection apparatus
45: flight forming portion
45a: body portion
53: flight

BEST MODE FOR CARRYING OUT THE INVENTION

The embodiments of the present invention will next be described in detail with reference to the drawings. Here, an injection molding machine, which is an example molding machine, will be described.

Figure 4:
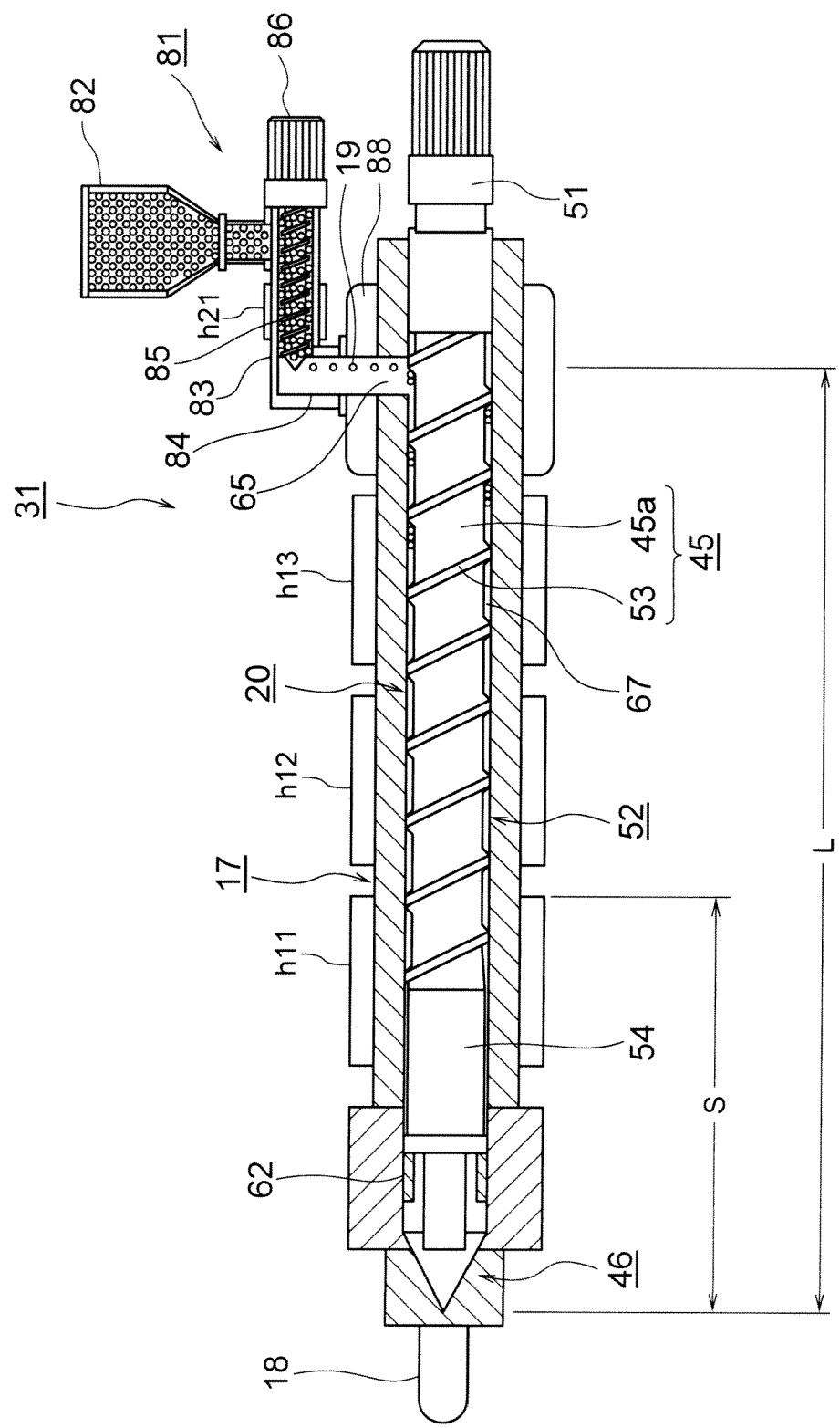
[FIG. 4] Schematic view showing a main portion of an injection apparatus according to a first embodiment of the present invention.
Figure 5:
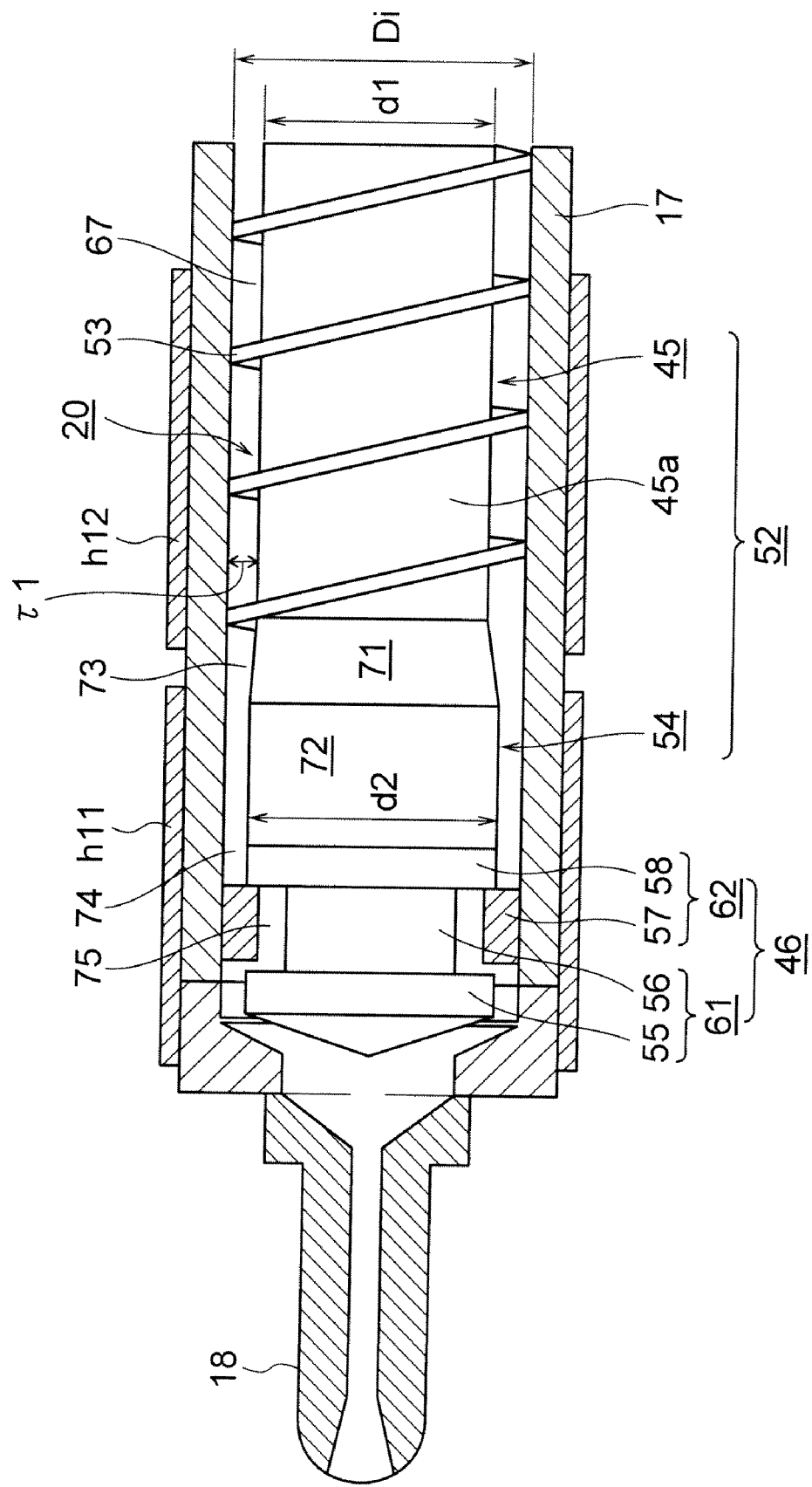
[FIG. 5] Enlarged view showing the main portion of the injection apparatus according to the first embodiment of the present invention.

FIG. 4 is a schematic view showing a main portion of an injection apparatus according to a first embodiment of the present invention. FIG. 5 is an enlarged view showing the main portion of the injection apparatus according to the first embodiment of the present invention.

In these drawings, reference numeral 31 denotes an in-line-screw-type injection apparatus. The injection molding machine includes an unillustrated mold apparatus, an unillustrated mold-clamping apparatus, and the injection apparatus 31. The mold apparatus includes a stationary mold (first mold), and a movable mold (second mold). The mold-clamping apparatus includes a stationary platen, to which the stationary mold is mounted, and a movable platen, to which the movable mold is mounted. The movable platen is advanced and retreated by means of a mold-clamping cylinder, whereby the mold apparatus is closed, clamped, and opened.

The injection apparatus 31 includes a heating cylinder (cylinder member) 17; an injection nozzle (nozzle member) 18 attached to the front end of the heating cylinder 17; a screw (injection member/metering member) 20 disposed within the heating cylinder 17 such that the screw 20 can rotate and can advance and retreat; heaters (heating members) h11 to h13 attached to the outer circumference of the heating cylinder so as to surround the heating cylinder 17; an unillustrated drive apparatus disposed rearward of the heating cylinder 17; etc.

The screw 20 is composed of a screw body (injection member body) 52 and an injection portion 46 disposed frontward of the screw body 52, and is connected to the drive apparatus via a shaft portion 51 at the rear end. The screw body 52 includes a flight forming portion (plasticizing portion) 45 and a pressure member (kneading portion) 54 removably attached to the flight forming portion 45 at its front end.

The flight forming portion 45 includes a bar-shaped body portion 45a and a spiral flight 53 projectingly formed on the outer circumferential surface of the body portion 45a. A spiral groove 67 is formed along the flight 53. In the flight forming portion 45, over the entire region of the flight forming portion 45; i.e., from the front end to the rear end thereof, the flight 53 is formed at a constant pitch, the flight 53 has a constant outer diameter or a flight crest diameter Di, the body portion 45a has a constant diameter or a flight trough diameter d1, and the groove 67 has a constant depth.

The pressure member 54 is formed to extend over a predetermined range extending frontward from the front end of the flight forming portion 45 and to be located adjacent to a reverse-flow prevention apparatus 62. Thus, the pressure member 54 forms a flat region on the surface thereof over a predetermined distance. The pressure member 54 includes an inclined portion (first pressure portion) 71, and a large-diameter portion (cylindrical columnar portion/second pressure portion) 72. The inclined portion 71 is formed such that its diameter increases frontward, and has a conical shape. The large-diameter portion 72 is formed adjacent to the front end of the inclined portion 71 to be integral therewith. The large-diameter portion 72 has a cylindrical columnar shape and has a constant diameter d2 over the entire length.

Further, an unillustrated screw portion is formed at the rear of the inclined portion 71, and an unillustrated screw hole is formed in the flight forming portion 45 such that the screw hole is opened at the front end surface thereof. Accordingly, the pressure member 54 can be attached to the flight forming portion 45 through screw-engagement of the screw portion with the screw hole. Notably, in the present embodiment, the pressure member 54 is fixed to the flight forming portion 45 by means of screw engagement. However, the pressure member 54 can be fixed to the flight forming portion 45 by means of welding in place of screw engagement.

The diameter of the front end of the inclined portion 71 is made equal to the diameter d2 of the large-diameter portion 72, and the diameter of the rear end of the inclined portion 71 is made equal to the flight trough diameter d1. Notably, in the present embodiment, the outer circumferential surface of the inclined portion 71 has a constant inclination; however, if necessary, the outer circumferential surface may be curved in accordance with a predetermined function.

A resin passage (first molding material passage) 73 is formed between the inclined portion 71 and the heating cylinder 17, and a resin passage (second molding material passage) 74 is formed between the large-diameter portion 72 and the heating cylinder 17. In this case, as described above, the diameter of the inclined portion 71 increases frontward, so that the cross sectional area of the resin passage 73 decreases frontward. Since the diameter d2 of the large-diameter portion 72 is constant over its length, the cross sectional area of the resin passage 74 is maintained constant over the entire length of the resin passage 74.

In the present embodiment, the pressure member 54 includes the inclined portion 71 and the large-diameter portion 72. However, the pressure member 54 may be formed by only an inclined portion having no undulations. In this case, the diameter is increased frontward, the diameter of the rear end of the pressure member 54 is made equal to the above-mentioned flight trough diameter d1, and the diameter of the front end of the pressure member 54 is made equal to the above-mentioned diameter d2.

Meanwhile, the injection portion 46 includes a head portion 55 having a conical portion at its front end; a rod portion 56 formed rearward of and adjacent to the head portion 55; a check ring 57 disposed around the rod portion 56; and a seal ring 58 attached to the front end of the screw body 52. A resin passage (third molding material passage) 75 is formed between the rod portion 56 and the check ring 57.

Further, an unillustrated screw portion is formed at the rear of the rod portion 56, and an unillustrated screw hole is formed in the pressure member 54 such that the screw hole is opened at the front end surface thereof. Accordingly, through screw-engagement of the screw portion with the screw hole, the injection member 46 can be attached to the screw body 52 with the seal ring 58 pressed against the front end of the pressure member 54. Notably, the head portion 55, the rod portion 56, and the screw portion constitute a screw head (injection member head portion) 61; and the check ring 57 and the seal ring 58 constitute the reverse-flow prevention apparatus 62, which prevents reverse flow of resin during an injection step.

In a metering step, when the check ring 57 is caused to move forward in relation to the rod portion 56 as the screw 20 is retreated, the check ring 57 is separated from the seal ring 58, so that the resin passage 75 communicates with the resin passage 74, and the reverse-flow prevention apparatus 62 stops its sealing operation. In an injection step, when the check ring 57 is caused to move rearward in relation to the rod portion 56 as the screw 20 is advanced, the check ring 57 is brought into contact with the seal ring 58, so that the communication between the resin passage 74 and the resin passage 75 is broken, and the reverse-flow prevention apparatus 62 starts its sealing operation.

The drive apparatus includes a metering motor, serving as a drive portion for metering, and an injection motor, serving as a drive portion for injection.

A resin supply port (molding material supply port) 65 is formed in the heating cylinder 17 at a predetermined position in the vicinity of the rear end thereof. The resin supply port 65 is formed at such a location that when the screw is located at the advance limit position within the heating cylinder 17, the resin supply port 65 faces a rear end portion of the groove 67.

A charging section (molding material supply apparatus) 81 for charging resin is attached to the resin supply port 65, and a hopper (molding material storage portion) 82 for storing resin is attached to the upper end of the charging section 81. The resin stored in the hopper 82 is fed to the resin supply port 65 via the charging section 81, and is supplied from the resin supply port 65 to the interior of the heating cylinder 17.

The charging section 81 includes a cylinder portion 83 extending horizontally, a tubular guide portion 84 extending downward from the front end of the cylinder portion 83, a feed screw 85 rotatably disposed within the cylinder portion 83, a feed motor (feed drive portion) 86 for rotating the feed screw 85, a heater (heating member) h21 disposed around the cylinder portion 83, etc. The cylinder portion 83 is connected to the hopper 82 at its rear end, and communicates with the guide portion 84 at its front end.

Accordingly, when the feed screw 85 is rotated through drive of the feed motor 86, the resin within the hopper 82 is supplied into the cylinder portion 83, and caused to advance along a groove formed on the outer circumferential surface of the feed screw 85, so that the resin is fed from the front end of the feed screw 85 into the guide portion 84, and falls within the guide portion 84, whereby the resin is supplied into the heating cylinder 17. At this time, pellets 19 fall within the guide portion 84 in line, and are supplied into the heating cylinder 17 via the resin supply port 65.

An annular cooling jacket (cooling apparatus) 88 is formed on the heating cylinder 17 in the vicinity of the resin supply port 65 so as to surround the heating cylinder 17, the resin supply port 65, and a lower end portion of the guide portion

84. Water (cooling medium) is supplied to the cooling jacket 88. This water prevents melting of the resin which falls within the guide portion 84 and is supplied into the heating cylinder 17 via the resin supply port 65.

Notably, S represents a screw stroke, which is a distance between the retreat limit and the advance limit of the screw 20; L represents a screw effective length, which is a distance between the rear end of the resin supply port 65 and the front end of the screw 20 as measured when the screw 20 is located at the advance limit position.

An unillustrated control section is provided so as to control the injection molding machine; specifically, drive the injection motor, the metering motor, the feed motor 86, etc, and supply electricity to the heaters h11-h13 and h21. The control section includes not only a CPU (computation apparatus), a memory (storage apparatus), but also a display section, an operation section, etc. The control section performs various computations in accordance with a predetermined program, data, etc. to thereby function as a computer.

In the injection apparatus 31 having the above-described configuration, in a metering step, the feed screw 85 and the screw 20 are rotated in their normal directions through drive of the feed motor 86 and the metering motor in their normal directions. Thus, the resin supplied from the hopper 82 into the cylinder portion 83 is caused to advance along the groove of the feed screw 85, and is pre-heated during the advancement. The resin is then supplied into the guide portion 84 from the front end of the cylinder portion 83, and is supplied into the heating cylinder 17 via the resin supply port 65. Notably, within the cylinder portion 83, the resin is preheated to a temperature at which the resin does not melt; e.g., a predetermined temperature equal to or less than the glass transition temperature.

The resin supplied into the heating cylinder 17 is caused to advance along the groove 67, and is heated and melted by the heaters h11 to h13. The pressure of the resin increases gradually as the resin advances to the front end of the screw body 52 from a pressure increase start point which is shifted rearward from the pressure member 54 by a predetermined distance.

Subsequently, the resin is caused to pass through the resin passage 73, whereby the pressure of the resin increases further, and is caused to advance while passing through the resin passage 74. Therefore, the resin is kneaded sufficiently.

At this time, since the check ring 57 is moved forward in relation to the rod portion 56, communication is established between the resin passages 74 and 75, so that the resin within the resin passage 74 is caused to pass through the resin passage 75 to be fed to the space forward of the screw head 61. Accordingly, an amount of molten resin corresponding to a single shot is accumulated in the space forward of the screw head 61 in a state in which the screw 20 is positioned at the retreat limit position within the heating cylinder 17. Notably, an unillustrated cut is formed in the head portion 55 such that the resin passage 75 communicates with the space forward of the screw head 61.

Subsequently, in an injection step, the screw 20 is advanced through drive of the injection motor, whereby the resin accumulated forward of the screw head 61 is injected from the injection nozzle 18, and is charged into a cavity of the above-described mold apparatus.

Incidentally, as described above, in the screw body 52, the pressure member 54 is formed in a predetermined range extending from the front end thereof in such a manner that the pressure member 54 is located adjacent to the reverse-flow prevention apparatus 62. Further, the pressure member 54 has a flat outer circumferential surface.

That is, the resin supplied from the resin supply port 65 is caused to advance within the groove 67, while being guided by the flight 53, as the screw 20 rotates in a metering step. However, when the resin reaches the pressure member 54, the resin is not guided by the flight, because the flight is not formed on the pressure member 54, so that the force by which the resin is advanced decreases.

Accordingly, the moving speed of the resin decreases in the resin passages 73 and 74. Therefore, the pressure member 54 functions as a movement restriction member for restricting advancement of the resin caused to advance within the groove from the rear. As a result, since advancement of the resin within the groove 67 is restricted, in a region forward of the pressure increase start point, the resin pressure increases toward the front.

Further, in the pressure member 54, the diameter of the inclined portion 71 increases toward the front so that the cross sectional area of the resin passage 73 decreases toward the front, and the diameter d2 of the large-diameter portion 72 is greater than the flight trough diameter d1 but smaller than the flight crest diameter Di.

Accordingly, the function of the pressure member 54 as a movement restriction member can be enhanced further, whereby the pressure of resin in the region located forward of the pressure increase start point can be increased further. Notably, the radial distance t1 between the outer circumferential surface of the body portion 45a and the outer circumferential edge of the flight 53 is represented by the following equation.

$$t1=(Di-d1)/2$$

Further, when the distance between the outer circumferential surface of the large-diameter portion 72 and the circumferential edge of the flight 53 is represented by t2, the ratio of the distance t2 to the distance t1; i.e., the ratio t2/t1, becomes smaller than 1.

As a result, in a state in which the screw 20 is located at the advance limit position, a region extending from a molding material supply point, which is formed at a position corresponding to the rear end of the resin supply port 65, to the pressure increase start point constitutes a supply portion; a region extending from the pressure increase start point to the front end of the flight forming portion 45 constitutes a compression portion; and a region extending from the front end of the flight forming portion 45 to the front end of the pressure member 54 constitutes a kneading (metering) portion. Therefore, plasticization similar to that performed in conventional injection apparatuses can be performed, so that resin can be kneaded sufficiently. Further, since the pressure of the resin after being melted can be increased at the kneading portion, kneading of resin can be performed more sufficiently.

Further, the resin pressure at the compression portion can be increased through mere formation of the large-diameter portion 72, and the flight trough diameter d1 is not required to be changed along the axial direction of the flight forming portion 45.

Since the shape of the screw 20 can be simplified, the cost of the screw 20 can be lowered. Further, the simplified shape decreases the number of locations where resin stagnates, to thereby prevent occurrence of resin burning, whereby the quality of molded products can be improved.

Figure 2:
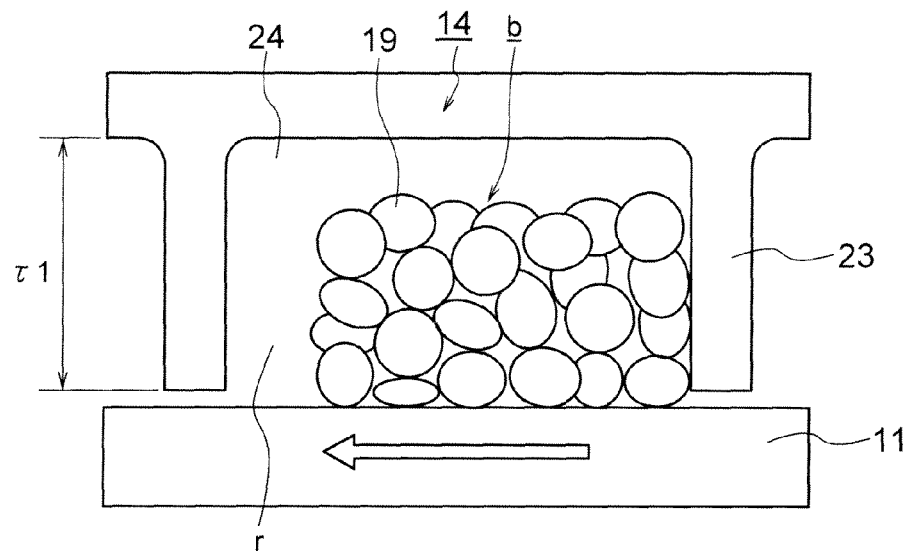
[FIG. 2] Schematic view showing a state where resin is melted within the conventional injection apparatus.
Figure 3:
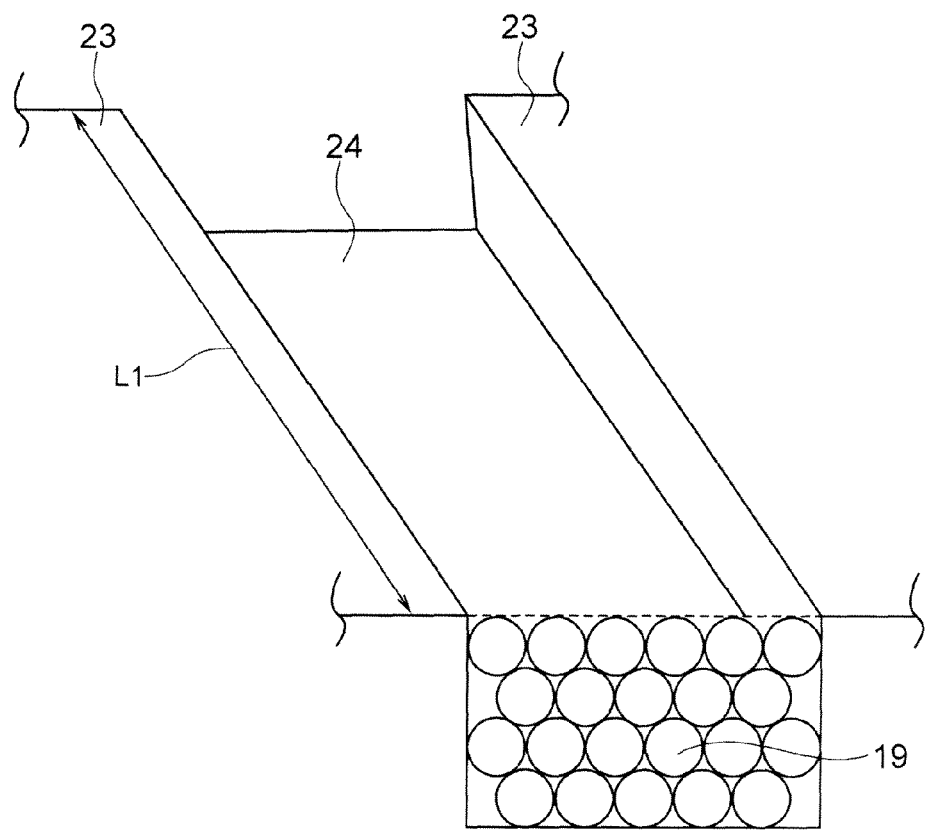
[FIG. 3] View used for explaining a developed distance of the conventional injection apparatus.

Incidentally, if pellets of the resin supplied via the resin supply port 65 aggregate while being caused to advance within the heating cylinder 17, with the result that a solid bed b composed of a plurality of resin pellets 19 (see FIG. 2) is formed, a long period of time is required to completely melt the pellets 19.

In order to solve this problem, in the present embodiment, a groove-depth setting region for preventing formation of the solid bed b is defined in a predetermined section of the flight forming portion 45 with respect to the length direction thereof. In the groove-depth setting region, the ratio γ1 of a groove depth τ1 to a diameter δ1 of pellets 19 (γ1=τ1/δ1) is set to fall within the following range:

$$1 \leq \gamma 1 \leq 2.5,$$

and preferably, $$1 \leq \gamma 1 \leq 2.0.$$

Notably, since the groove depth τ1 is equal to the distance t1, the following equation stands:

$$\tau 1 = (Di - d1)/2.$$

In the present embodiment, the pellets 19 have a spherical shape. However, in the case where the pellets 19 have a non-spherical shape, the diameter δ1 of the pellets 19 may be the largest one of diameters of various portions of each pellet 19; i.e., the maximum diameter, the smallest one of diameters of various portions of each pellet 19; i.e., the minimum diameter, or an intermediate value (e.g., mean value) between the maximum diameter and the minimum diameter.

The groove-depth setting region is formed over such an axial length that formation of the solid bed b can be prevented, and preferably formed over a section extending from a point which corresponds to the rear end of the resin supply port 65 when the screw 20 is located at the advance limit position to the forward end of the flight forming portion 45. Further, the groove-depth setting region may be formed over a section extending from the point corresponding to the rear end of the resin supply port 65 to a location where the resin melts completely, or may be formed to extend forward from the point corresponding to the rear end of the resin supply port 65 over a distance equal to the length of the screw stroke S.

Notably, in actuality, the groove-depth setting region is set by the axial length of the screw 20 or the length of the groove 67.

Next, a state where resin melts will be described.

FIG. 6 is a schematic view relating to the first embodiment of the present invention and showing a state where resin is melted. FIG. 7 is a view used for explaining a developed distance of the injection apparatus according to the first embodiment of the present invention.

In these drawings, reference numeral 17 denotes a heating cylinder, 20 denotes a screw, 53 denotes a flight, 67 denotes a groove, 19 denotes pellets, and r represents a melt pool formed by molten resin.

As described above, the ratio γ1 is set to fall within the following range:

$$1 \leq \gamma 1 \leq 2.5,$$

and preferably, $$1 \leq \gamma 1 \leq 2.0.$$

Therefore, in the groove 67, two pellets 19 cannot be stacked in the depth direction of the groove 67 (radial direction). Accordingly, the pellets 19 do not aggregate and are caused to advance along the groove 67 in a direction of a solid line allow, while being arranged laterally. Further, in the above-described injection apparatus 31 (FIG. 4), the friction coefficient of the inner circumferential surface of the heating cylinder 17 is set to be larger than that of the outer circumferential surface of the screw 20 so that molten resin advances when the screw 20 is rotated. Accordingly, as the screw 20 rotates, the pellets 19 advance within the groove 67, while rolling (rotating) due to friction with the inner circumferential surface of the heating cylinder 17.

As a result, the solid bed b (see FIG. 2) is not formed by the pellets 19, and the pellets 19 are heated in a state where their heat capacity is small. Accordingly, the resin can be melted within a short period of time, and, as shown in FIG. 7, a developed distance L2 within which the resin melts completely can be shortened. Thus, the screw 20 can be shortened accordingly.

Further, since the heating cylinder 17 can also be shortened, the axial dimension of the injection apparatus 31 decreases, and a work of removing and inserting the screw 20 can be readily performed when the screw 20 is maintained or replaced with a different one.

Since the surface area of the heating cylinder 17 decreases, the amount of radiated heat decreases, so that the energy efficiency of the injection apparatus can be increased. In addition, since the resin is not uselessly heated, occurrence of resin burning can be suppressed.

Moreover, the space formed between the inner circumferential surface of the heating cylinder 17 and the screw 20 functions as a heat supply space for supplying heat from the heaters h11 to h13 to the pellets 19. Since the pellets 19 advance within the groove 67, while rolling in contact with the inner circumferential surface of the heating cylinder 17, as indicated by broken-line arrows, the heat of the heaters h11 to h13 is transferred to the pellets 19 via the heating cylinder 17 by means of rolling heat transfer. Accordingly, the resin can be heated and melted efficiently and uniformly. As a result, the quality of molded products can be improved.

Notably, since the pellets 19 are pre-heated within the cylinder portion 83, melting is started immediately when the pellets 19 are supplied into the heating cylinder 17. Accordingly, the time required to completely melt the pellets 19 can be shortened, whereby the screw 20 can be shortened further, and the axial dimension of the injection apparatus 31 can be reduced further.

In addition, since the pellets 19 are smoothly advanced within the groove 67, shearing heat generation can be suppressed. Accordingly, resin burning does not occur, and the quality of molded products can be improved.

Incidentally, if a large amount of resin is supplied into the heating cylinder 17 via the resin supply port 65 within a short period of time without the supply amount being controlled, the above-described heat supply space is filled with an excess amount of resin, and a pressure is applied to pellets 19 before being melted within the groove 67, so that the pellets 19 restrain their movements one another. Consequently, the pellets 19 do not roll, and the heat of the heaters h11 to h13 is not transferred to the pellets 19 by means of rolling heat transfer. In such a case, a portion of the pellets 19 do not melt, so that it becomes impossible to uniformly melt the resin. In addition, a jamming failure of the screw 20 occurs.

In order to solve the above-described drawback, supply-amount control processing means (supply-amount control processing section) of the CPU performs supply-amount control processing so as to control the amount of the resin supplied into the heating cylinder 17 by controlling the rotational speed of the feed motor 86. In such a case, a rotational speed to which the feed motor 86 is controlled; i.e., a target rotational speed, is set so that, as shown in FIG. 4, a predetermined amount of pellets 19 are caused to continuously fall and are supplied to the resin supply port 65.

As described above, in the present embodiment, since the supply amount of the resin is controlled, the heat supply space is appropriately filled with the resin, and no pressure is applied to pellets 19 before being melted within the groove 67. Therefore, the pellets 19 do not restrain their movements one another, and are caused to roll and move. Consequently, the heat of the heaters h11 to h13 is transferred to the pellets 19 by means of rolling heat transfer, so that it becomes possible to uniformly melt the resin, and to prevent occurrence of a jamming failure of the screw 20. As a result, the quality of molded products can be improved. In addition, since the resin can be melted sufficiently, the developed distance L2 can be shortened reliably, and the screw 20 can be shortened sufficiently.

Moreover, heating-amount adjustment processing means (heating-amount adjustment processing section) of the CPU performs heating-amount adjustment processing so as to adjust the amount of heating of the resin by controlling the supply of electricity to the heaters h11 to h13, to thereby control the temperature of the resin. Accordingly, the speed at which the pellets 19 roll; i.e., rolling speed, can be controlled, whereby the developed distance L2 can be controlled.

FIG. 8 is a table relating to the first embodiment of the present invention and for showing an evaluation result as to whether the solid bed was formed.

In FIG. 8, X represents that the solid bed b was formed, and o represents that the solid bed b was not formed.

As shown in FIG. 8, the solid bed b was not formed if the ratio γ1 was 1.0, 2.0, and 2.5, and the solid bed was formed if the ratio was 3.0 and 3.5.

As described above, in the present embodiment, the ratio γ1 of the groove depth τ1 to the diameter δ1 is set to fall within the following range:

$$1 \leq \gamma1 \leq 2.5,$$

and preferably, $$1 \leq \gamma1 \leq 2.0.$$

In addition, the charging section 81 is provided in order to preheat the pellets 19, and the amount of resin supplied to the heating cylinder 17 is controlled. Thus, the conditions for melting resin; i.e., the melding conditions, are satisfied. However, if the design conditions of the screw 20 such as the screw stroke S and the screw effective length L are not appropriate, resin cannot be melted properly. That is, when the screw effective length L is less than a proper value set in accordance with the screw stroke S, resin cannot be melted completely. When the screw effective length L is greater than the proper value, a time over which resin advances within the heating cylinder 17 is excessively long, so that resin burning occurs.

In view of the above, in the present embodiment, an index ε, which represents the degree of properness of the design conditions of the screw 20, is obtained by the following equation; i.e., by dividing, by the screw stroke S, a value obtained by adding the screw stroke S and the screw effective length L together.

$$\epsilon=(S+L)/S$$

The index ε was changed to assume different values, and the melting state of resin was observed for each value of the index ε.

As a result, it was found that when the index ε is set to fall within the following range:

$$2.5<\epsilon<4.5,$$

resin can be melted satisfactorily. That is, resin was able to be melted to a sufficient degree, and occurrence of resin burning was able to be prevented.

Notably, when the index ε is set to fall within the following range:

$$3.0<\epsilon<4.0,$$

resin was able to be melted more satisfactorily. That is, resin was able to be melted completely, and occurrence of resin burning was able to be prevented without fail.

Notably, in the injection apparatus 31, in view of the resin melting state, the screw effective length L can be approximated to a heating cylinder length Lh; i.e., the distance between the rear end of the heating cylinder 17 and the front end of the injection nozzle 18.

In this case, an index ε', which represents the degree of properness of the design conditions of the screw 20, is obtained by the following equation; i.e., by dividing, by the screw stroke S, a value obtained by adding the screw stroke S and the heating cylinder length Lh together.

$$\epsilon'=(S+Lh)/S$$

The index ε' was changed to assume different values, and the melting state of resin was observed for each value of the index ε'.

As a result, it was found that when the index ε' is set to fall within the same range as that for the index ε, resin can be melted satisfactorily.

Incidentally, in the injection apparatus 31 having the above-described configuration, the flight 53 formed on the screw 20 has a single-flight structure; i.e., is composed of a single projection which is continuously formed to spirally extend. Accordingly, the lead of the flight 53 (pitch of the flight 53); i.e., an axial distance over which a point on the flight 53 advances when the point moves along the flight 53 over a distance corresponding one turn of the flight 53, is made equal to the width of the groove 67 as measured along the axial direction of the screw 20.

Accordingly, the resin, which is supplied to the heating cylinder 17 via the resin supply port 65 after having fallen within the guide portion 84, is caused by the flight 53 to advance within the single groove 67 continuously formed to spirally extend. At that time, if the width of the groove 67 is greater than the diameter δ1 of the pellets 19, a large number of the pellets 19 are accommodated within the groove 67, and a pressure acts on each of the pellets 19, so that each of the pellets 19 restricts movements of other pellets 19. As a result, it becomes impossible to melt resin to a sufficient degree.

In contrast, in the case where the lead is shortened, and the width of the groove 67 is decreased, the groove 67 becomes longer accordingly, so that the time over which resin resides within the heating cylinder 17 increases, and resin burning may occur.

In view of the above-described problem, an injection apparatus according to a second embodiment of the present invention can prevent the pellets 19 from mutually restricting their movements, can melt resin to a sufficient degree, and does not cause resin burning. The injection apparatus according to the second embodiment will be described. Notably, components having the same structures as those in the first embodiment are denoted by the same reference numerals, and their repeated descriptions are omitted. For the effect that the second embodiment yields through employment of the same structure, the description of the effect of the first embodiment is incorporated herein by reference.

Figure 9:
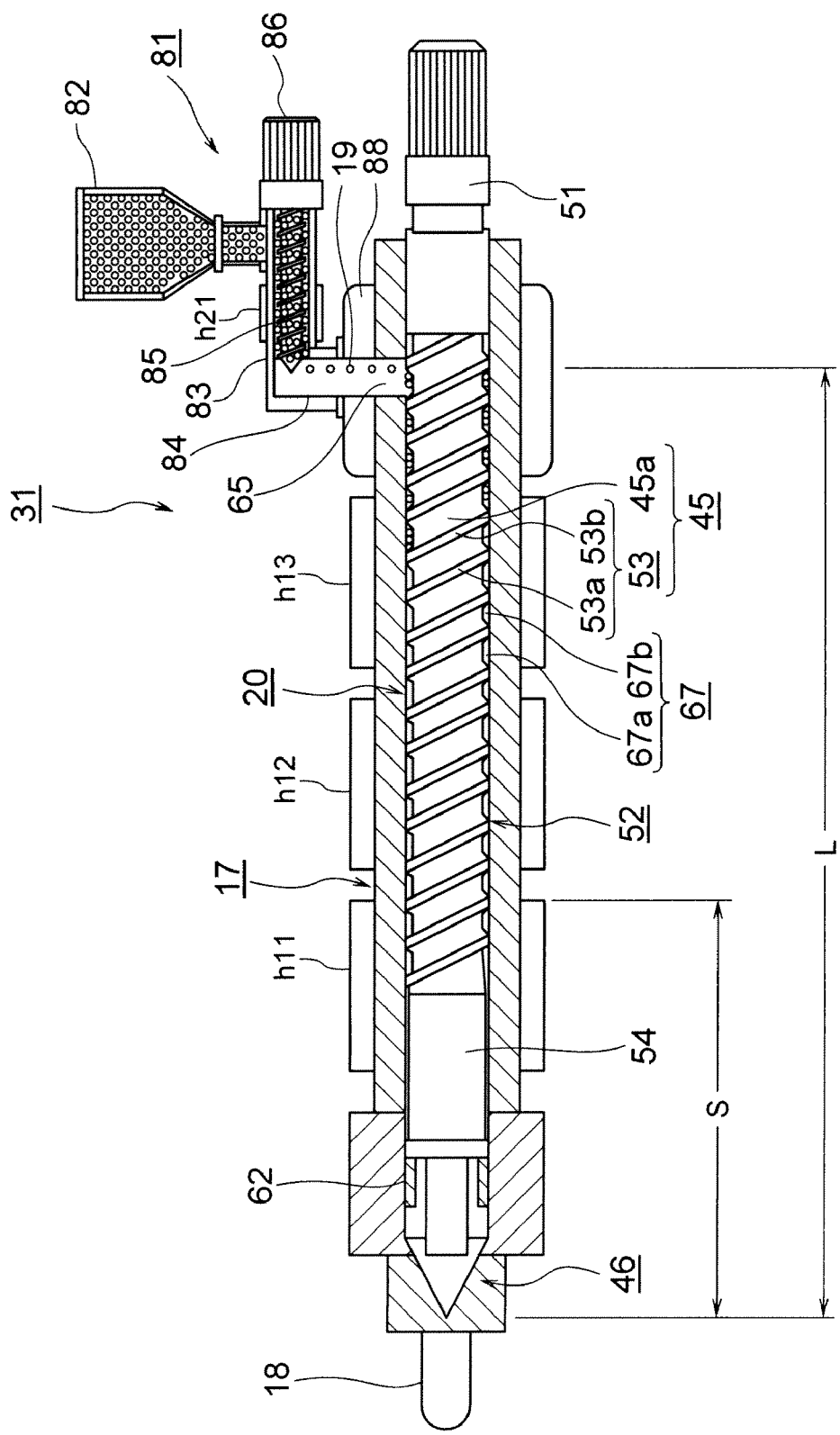
[FIG. 9] Schematic view showing a main portion of an injection apparatus according to a second embodiment of the present invention.

FIG. 9 is a schematic view showing a main portion of the injection apparatus according to the second embodiment of the present invention.

In FIG. 9, reference numeral 45 denotes a flight forming portion 45 serving as a plasticizing portion. The flight forming portion 45 includes a bar-shaped body portion 45a and a spiral flight 53 projectingly formed on the outer circumferential surface of the body portion 45a. A spiral groove 67 including first and second grooves 67a and 67b is formed along the flight 53. In the present embodiment, the flight 53 has a double-flight structure; i.e., includes first and second flight portions 53a and 53b, which are continuously formed to spirally extend. The first and second grooves 67a and 67b are formed along the first and second flight portions 53a and 53b, respectively. Accordingly, the resin, which is supplied to the heating cylinder 17 via the resin supply port 65 (the molding material supply port) after having fallen within the guide portion 84, is divided into two portions which are caused by the first and second flight portions 53a and 53b to individually advance within the first and second grooves 67a and 67b.

In this case, even when the leads of the first and second flight portions 53a and 53b are made equal to that of the flight 53 of the first embodiment, the widths of the first and second grooves 67a and 67b can be made half the width of the groove 67 of the first embodiment, whereby the amount of the pellets 19 (FIG. 7) accommodated in each of the first and second grooves 67a and 67b can be halved. Accordingly, within the first and second grooves 67a and 67b, pressure does not act on the pellets 19, and the pellets 19 can be prevented from mutually restricting their movements. As a result, resin can be melted to a sufficient degree.

Further, since the lead of the first and second flight portions 53a and 53b does not increase, the time over which resin resides within the heating cylinder 17 does not increase, and resin burning does not occur.

In the present embodiment, while the index $\epsilon$ was changed to assume different values, the melting state of resin was observed for each value of the index $\epsilon$.

As a result, as shown in FIGS. 10 to 13 which are described later, it was found that when the index $\epsilon$ is set to fall within the following range:

$2.0<\epsilon<4.0$, resin can be melted satisfactorily. That is, resin was able to be melted to a sufficient degree, and occurrence of resin burning was able to be prevented.

Notably, when the index $\epsilon$ is set to fall within the following range:

$2.5<\epsilon<3.5$, resin was able to be melted more satisfactorily. That is, resin was able to be melted completely, and occurrence of resin burning was able to be prevented without fail.

Next, there will be described the results of comparison between the melting state of resin when the conventional injection apparatus was used, and the melting state of resin when the injection apparatus 31 of the first or second embodiment was used.

Figure 10:
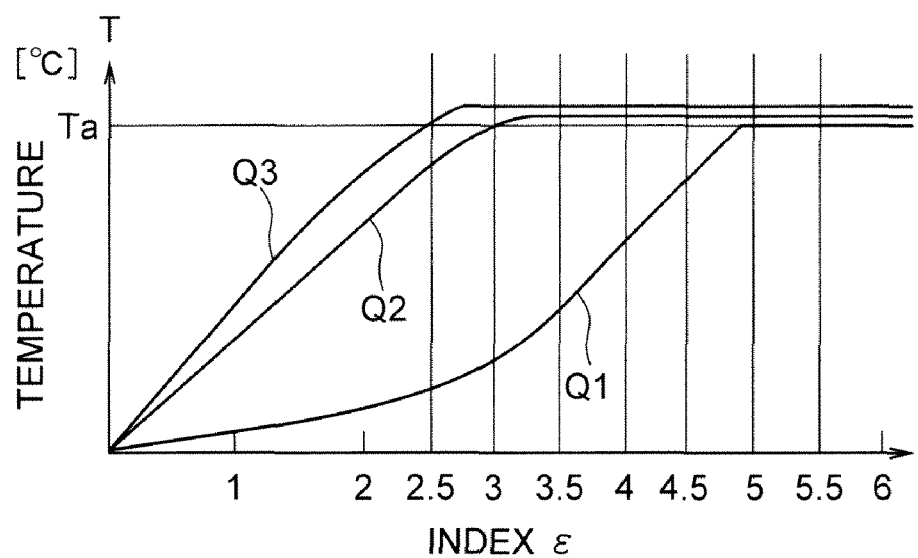
[FIG. 10] First graph showing melting states of resin.
Figure 11:
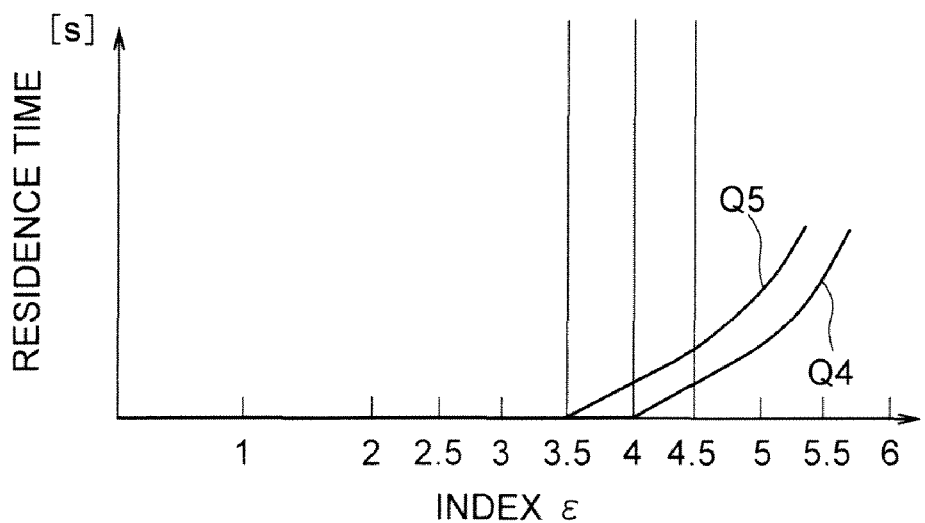
[FIG. 11] Second graph showing melting states of resin.
Figure 12:
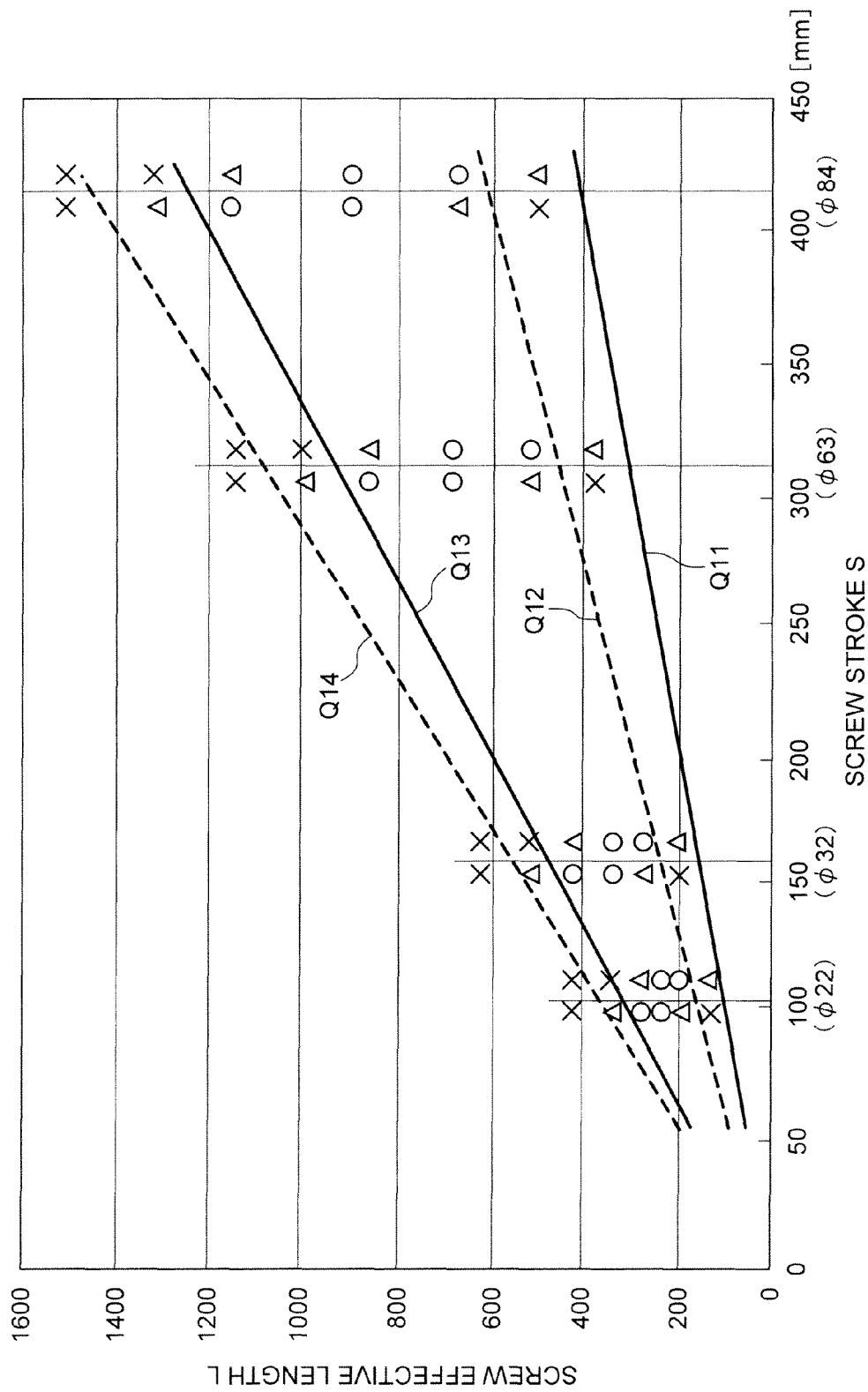
[FIG. 12] Table showing a detailed comparison of melting states of resin for each screw.

FIG. 10 is a first graph showing melting states of resin. FIG. 11 is a second graph showing melting states of resin. FIG. 12 is a table showing a detailed comparison of melting states of resin for each screw. FIG. 13 is a table showing a comparison of melting states of resin for each screw. In FIG. 10, the horizontal axis represents the index $\epsilon$, and the vertical axis represents the temperature of resin when it reaches the front end of the flight forming portion 45 (FIG. 9). In FIG. 11, the horizontal axis represents the index $\epsilon$, and the vertical axis represents the time over which resin resides within the heating cylinder 17 after having melted completely. In FIG. 12, the horizontal axis represents the screw stroke S, and the vertical axis represents the screw effective length L.

In these drawings, Q1 shows the melting state of resin in the case where a standard screw of a conventional injection apparatus is used; Q2 shows the melting state of resin in the case where the injection apparatus 31 (FIG. 4) of the present invention is used and the screw 20, serving as an injection member and an metering member, is of the single flight type; and Q3 shows the melting state of resin in the case where the injection apparatus 31 of the present invention is used and the screw 20 (FIG. 9) is of the double flight type in the second embodiment of the present invention. Further, Q4 shows the time over which resin resides within the heating cylinder 17 after having melted completely in the case where the injection apparatus 31 of the present invention is used and the screw 20 is of the single flight type; and Q5 shows the time over which resin resides within the heating cylinder 17 after having melted completely in the case where the injection apparatus 31 of the present invention is used and the screw 20 is of the double flight type. Ta represents the temperature at which resin melts completely.

As described above, in the case where the screw 20 is of the double flight type, pressure does not act on the pellets 19 within the first and second grooves 67a and 67b, and the pellets 19 can be prevented from mutually restricting their movements as compared with the screw 20 of the single flight type. As a result, resin can be melted to a sufficient degree, whereby the temperature represented by the state Q3 can be set higher than that represented by the state Q2.

In FIGS. 12 and 13, X represents the case where resin was not able to be melted sufficiently, or occurrence of resin burning was not able to be prevented; Δ represents the case where resin was able to be melted to a sufficient degree, and occurrence of resin burning was able to be prevented; and o represents the case where resin was able to be melted more sufficiently (i.e., resin was able to be melted completely) and occurrence of resin burning was able to be prevented without fail.

FIG. 12 also shows as evaluation result of the states of resin that was plasticized and melted using the screws 20 of the single flight type and the double flight type each having the flight crest diameter Di (FIG. 5) of 22[Φ: mm], 32[Φ: mm], 63[Φ: mm], and 84[Φ: mm], and the screw stroke S and the screw effective length L, which were determined in accordance with the flight crest diameter Di.

In addition, in FIG. 12, on the left side of the vertical line representing each flight crest diameter Di, the evaluation result is shown when the screw 20 of the single flight type was used; and on the right side of the vertical line, the evaluation result is shown when the screw 20 of the double flight type was used.

Further, lines Q11 to Q14 represent the cases when the index $\epsilon$ was 2.0, 2.5, 4.0, and 4.5, respectively. As described below, it is found that, when the screw is of the single flight type, the melting states of resin change at the boundaries of the lines Q12 and Q14, and when the screw is of the double flight type, the melting states of resin change at the boundaries of the lines Q11 and Q13.

That is, as shown in FIGS. 12 and 13, in the case where the screw 20 is of the single flight type, when the index $\epsilon$ is set to fall within the following range:

$2.5<\epsilon<4.5$, resin was able to be melted to a sufficient degree, and occurrence of resin burning was able to be prevented. When the index $\epsilon$ is set to fall within the following range:

$3.0<\epsilon<4.0$, resin was able to be melted completely, and occurrence of resin burning was able to be prevented without fail.

In the case where the screw 20 is of the double flight type, when the index $\epsilon$ is set to fall within the following range:

$2.0<\epsilon<4.0$, resin was able to be melted to a sufficient degree, and occurrence of resin burning was able to be prevented. When the index $\epsilon$ is set to fall within the following range:

$$2.5 < \epsilon < 3.5,$$

resin was able to be melted completely, and occurrence of resin burning was able to be prevented without fail.

In the case where the screw 20 is of the single flight type, in the region where the index $\epsilon$ is equal to or less than 2.5, the developed distance for melting resin cannot be secured sufficiently, because the screw effective length L is short as compared with the screw stroke S. Accordingly, resin cannot be melted sufficiently, and molding failure occurs.

In the region where the index $\epsilon$ is equal to or greater than 4.5 in the case where the screw 20 is of the single flight type, and in the region where the index $\epsilon$ is equal to or greater that 4.0 in the case where the screw 20 is of the double flight type, the screw effective length L becomes excessively long as compared with the screw stroke S, so that the time over which resin resides within the heating cylinder 17 increases, and resin burning may occur.

In the region where the index $\epsilon$ is equal to or less than 2.0, since the screw effective length L becomes short as compared with the screw stroke S, the screw head 61 is positioned rearward of the resin supply port 25 when the screw is located at the retreat limit position. Accordingly, injection cannot be performed in the injection apparatus 31.

In the above embodiments, the pellets 19 are caused to fall within the guide portion 84 while forming a single line and are supplied to the resin supply port 65. However, the pellets 19 are not necessarily required to be supplied to form a single line, so long as clearances are produced between the pellets 19 between the heating cylinder 17 and the screw 20 so as to prevent application of pressure to the pellets 19 before being melted. For example, application of pressure to the pellets 19 can be prevented by supplying a preset amount of resin at a time every time a preset time elapses.

The present invention is not limited to the above-described embodiments. Numerous modifications and variations of the present invention are possible in light of the spirit of the present invention, and they are not excluded from the scope of the present invention.

The invention claimed is:

1. An injection method of an injection apparatus comprising:
    a heating cylinder;
    a screw rotatably disposed within the heating cylinder and including a flight on an outer circumferential surface thereof; and
    a drive apparatus disposed at a rear end of the screw, the screw including a plasticizing portion which includes a body portion and the flight projectingly formed on an outer circumferential surface of the body portion; and an index $\epsilon$, which is obtained by dividing a value obtained by adding a screw stroke S of the screw and a screw effective length L representing a distance between a rear end of a molding material supply port formed on the heating cylinder and a front of the screw as measured when the screw is located at an advance limit position, together by the screw stroke S, satisfying the following relation:

$$2.0 < \epsilon < 4.5,$$

wherein a molding material is supplied into the heating cylinder in a manner that the molding material does not stack on one another in the heating cylinder.

2. An injection method according to claim 1, wherein
    (a) the molding material is plasticized in the plasticizing portion; and
    (b) the molding material is kneaded by a pressure member disposed at a front end of the plasticizing portion.

3. An injection apparatus comprising:
    (a) a heating cylinder;
    (b) a screw rotatably disposed within the heating cylinder and including a flight on an outer circumferential surface thereof; and
    (c) a drive apparatus disposed at a rear end of the screw, wherein
    (d) the screw includes a plasticizing portion which includes a body portion and the flight projectingly formed on an outer circumferential surface of the body portion; and wherein
    (e) an index $\epsilon$, which is obtained by dividing a value obtained by adding a screw stroke S of the screw and a screw effective length L representing a distance between a rear end of a molding material supply port formed on the heating cylinder and a front of the screw as measured when the screw is located at an advance limit position, together by the screw stroke S, satisfies the following relation:

$$2.0 < \epsilon < 4.5.$$

4. An injection apparatus according to claim 3, wherein the screw includes a section in which a ratio $\gamma 1$ of a groove depth $\tau 1$, which is the depth of a groove formed along the flight, to a diameter $\delta 1$ of a molding material falls within the following range:

$$1 \leq \gamma 1 \leq 2.5.$$

5. An injection apparatus according to claim 3, wherein an index $\epsilon'$, which is obtained by dividing a value obtained by adding the screw stroke S and a heating cylinder length Lh of the heating cylinder together by the screw stroke S, satisfies the following relation:

$$2.0 < \epsilon' < 4.5.$$

6. An injection apparatus according to claim 3, comprising a molding material supply apparatus which supplies a molding material into the heating cylinder in a manner that the molding material does not stack on one another in the heating cylinder.

7. An injection apparatus according to claim 3,
    (a) the screw includes the plasticizing portion on which the flight is formed and configured to plasticize the molding material, and a pressure member disposed at the front end of the plasticizing portion and including an outer diameter equal to or greater than an outer diameter of the plasticizing portion; and wherein
    (b) a flight is not formed on the pressure member.

8. An injection apparatus according to claim 3, wherein multiple flights are formed on the plasticizing portion.

* * * * *